United States Patent
Newell et al.

(10) Patent No.: US 12,469,045 B2
(45) Date of Patent: Nov. 11, 2025

(54) BLOCKCHAIN-BASED CONVERSATION MANAGEMENT

(71) Applicant: DISH Network L.L.C., Englewood, CO (US)

(72) Inventors: Nicholas Brandon Newell, Centennial, CO (US); Swapnil Anil Tilaye, Broomfield, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 18/410,376

(22) Filed: Jan. 11, 2024

(65) Prior Publication Data

US 2024/0152950 A1 May 9, 2024

Related U.S. Application Data (63) Continuation of application No. 15/987,464, filed on May 23, 2018, now Pat. No. 11,900,409.

(51) Int. Cl.
| | |
|---|---|
| *G06Q 30/0207* | (2023.01) |
| *G06Q 20/06* | (2012.01) |
| *G06Q 20/38* | (2012.01) |
| *H04L 9/00* | (2022.01) |
| *H04L 9/06* | (2006.01) |

(52) U.S. Cl.
CPC ....... *G06Q 30/0236* (2013.01); *G06Q 20/065* (2013.01); *G06Q 20/3829* (2013.01); *H04L 9/0643* (2013.01); *G06Q 2220/00* (2013.01); *H04L 9/50* (2022.05)

(58) Field of Classification Search
CPC ............. G06Q 30/0236; G06Q 20/065; G06Q 20/3829; G06Q 2220/00; H04L 9/0643; H04L 9/50
See application file for complete search history.

(56) References Cited

U.S. PATENT DOCUMENTS

| | | | |
|---|---|---|---|
| 9,608,829 B2 | 3/2017 | Spanos et al. | |
| 10,007,936 B1* | 6/2018 | Ghoshal | G06Q 50/01 |
| 10,783,539 B2* | 9/2020 | Frank | G06Q 30/0217 |
| 11,089,478 B2* | 8/2021 | Moshir | H04L 63/0428 |
| 2006/0047816 A1 | 3/2006 | Lawton et al. | |
| 2012/0221479 A1 | 8/2012 | Schneck, III et al. | |
| 2015/0089399 A1* | 3/2015 | Megill | H04L 12/1813 |
| | | | 715/753 |
| 2018/0349968 A1 | 12/2018 | O'Brien et al. | |
| 2019/0362376 A1 | 11/2019 | Newell et al. | |

\* cited by examiner

*Primary Examiner* — John W Hayes
*Assistant Examiner* — Zehra Raza
(74) *Attorney, Agent, or Firm* — Perkins Coie LLP (57) ABSTRACT

Disclosed is a conversation management system that manages conversations about a content using blockchain technology. The content management system can use the blockchain technology to validate the conversations, and provide a content provider of the content a secured access to the validated conversations. The validation of the conversations can ensure that the conversations are not fake, e.g., provided by real people and not generated using bots. A conversation about the content is added as a block to the blockchain upon validation, and once added may not be modified, and therefore, the content provider may be assured that the conversation is secure and genuine. The content provider can use the knowledge obtained from the validated conversations in making future content.

20 Claims, 9 Drawing Sheets

BLOCKCHAIN-BASED CONVERSATION MANAGEMENT

CROSS-REFERENCE TO RELATED PATENT APPLICATIONS

This application is a continuation of U.S. patent application Ser. No. 15/987,464, filed May 23, 2018, entitled "BLOCKCHAIN-BASED CONVERSATION MANAGEMENT," the entire disclosure of which is herein incorporated by reference.

BACKGROUND

Media Providers and Studios currently don't own the information and conversation from consumers about their content because the conversations happen in multiple places and not "locked up" for the media providers. For example, a media provider such as HBO may premiere a particular season of a particular TV show. When they do so, they would like to hear genuine audience opinions so they can follow it up with another great series on HBO, but they don't want other providers and social networks to even see this dialogue much less own this dialogue. Therefore, providers don't currently know why or why not users are watching their content. Furthermore, consumers don't currently have an immediate incentive or reward for participating on a social platform dedicated to media, e.g., TV and movies. And finally, social platforms create concerns with fake information, spamming, crude ideas, mean ideas, and "gaming the system" attacks. The current social platforms typically do not validate the information shared between the users.

DETAILED DESCRIPTION

Embodiments are directed to a conversation management system that manages conversations about a content using blockchain technology. The content management system can use the blockchain technology to validate conversations and provide a secured access to the validated conversations to a content provider of the content. The validation of the conversations can ensure that the conversations are not fake, e.g., provided by real people and not generated using bots. The content provider can use the knowledge obtained from the validated conversations in making future content.

In some embodiments, the conversation management system can be implemented as a social networking platform that uses blockchain technology to manage the conversations from users of the social networking platform. The conversation management system can exchange a token, e.g., cryptocurrency, for a conversation from a user by letting a quality of the conversation, instead of the compute resources used in the blockchain, to determine a number of tokens to be exchanged. The tokens can incentivize the users to carry out conversations in the social network platform rather than outside of the social network platform. This way, the conversations can be kept from being accessible to any or every content provider other than the content provider to whom the social network platform provides the access.

The conversation management system can store each conversation from a user as a separate block in the blockchain. When the conversation management system receives a request from a content provider for initiating conversations about a content, the conversation management system generates a genesis block of a blockchain that is indicative of the request. The request can also include a "starter" conversation from the content provider about the content, e.g., a conversation that elicits an opinion, feedback, a comment, or any other conversation from users of the conversation management system. The conversation management system presents the starter conversation to the users, who can view and carry out conversations via a graphical user interface (GUI) generated by the conversation management system. A first user can start a first conversation about the content. The conversation management system can then publish the first conversation to a set of users associated with the first user, e.g., friends of the first user in the social network platform, who can validate the first conversation. A user can validate a conversation by providing a validation input, such as a like, a comment, an audio review, a video review, a tag, a dub, a back, a recommend, or a share of the first conversation. After the first conversation has been validated, the conversation management system generates a second block of the blockchain to store the validated conversation, links the second block to the genesis block by storing a hash of the genesis block in the second block, and provides an access to the content provider to the second block to read the validated conversation. The content management system can also allocate a number of tokens to the first user, which can be determined based on a quality of the first conversation, for providing the first conversation. The first user can exchange the token for a product, service, or fiat currency.

In some embodiments, the conversation management system can generate multiple blockchains for managing conversations about multiple aspects of the content. For example, a media provider such as HBO may premier a particular season of a particular television (TV) show, and HBO might want to have separate conversations for the TV show, the season and a particular episode in the season. The conversation management system can generate a first blockchain to manage the conversations associated with the TV show, a second blockchain to manage the conversations associated with the particular season, and a third blockchain to manage the conversations associated with a particular episode.

Figure 1:
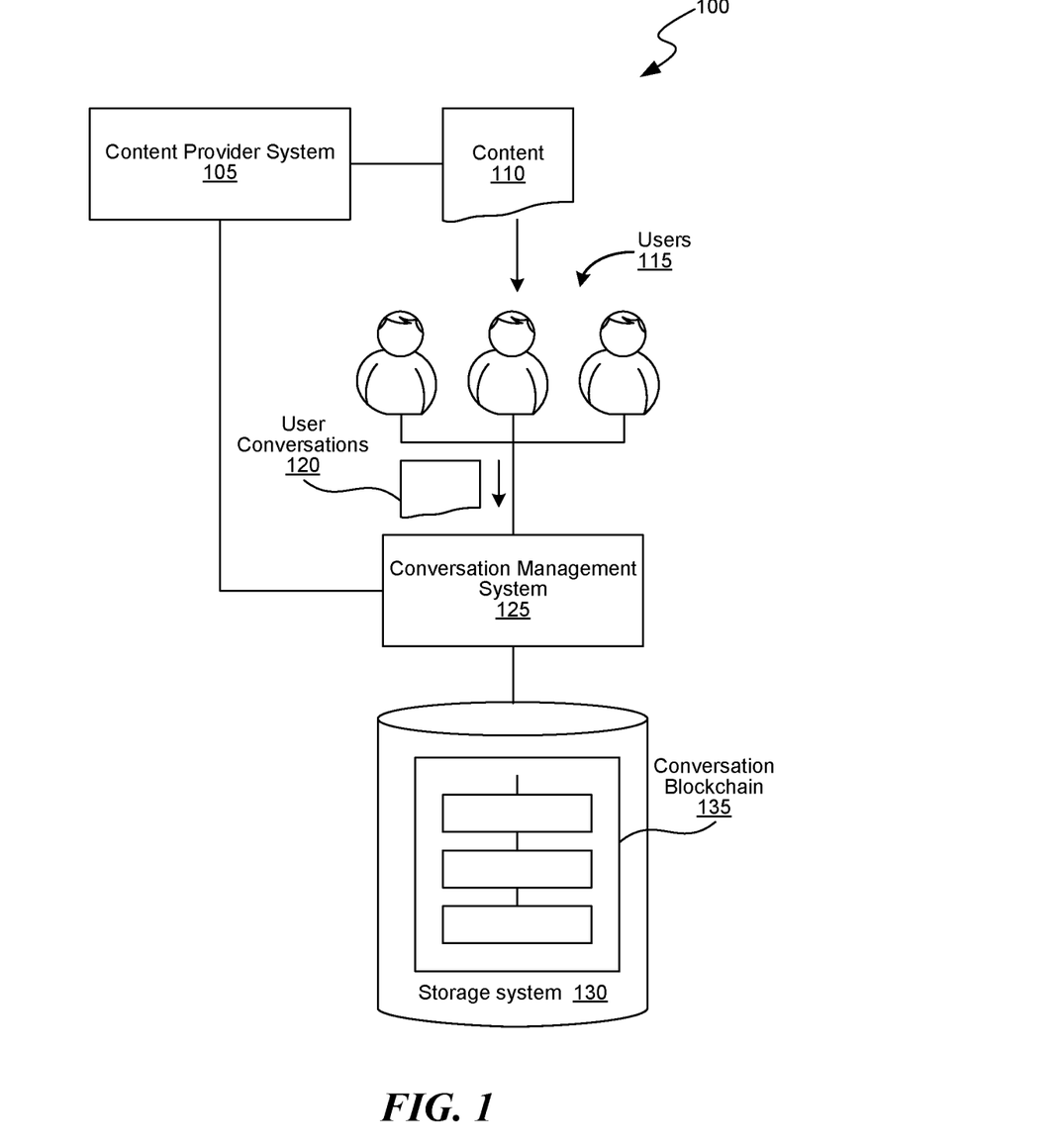
FIG. 1 is a block diagram of an environment in which the disclosed embodiments can be implemented.

Turning now to FIG. 1, FIG. 1 is a block diagram of an environment 100 in which the disclosed embodiments can be implemented. The environment 100 includes a content provider system 105, which a content provider can use to generate and/or provide content 110 for consumption by users 115. The content 110 can be any media content, such as TV shows, movies, documentaries, web series. The content provider can be any entity, e.g., movie studios, media broadcaster, producers, distributors, that generates and/or distributes the content 110. The content provider system 105 can include one or more devices, services, software, or a combination thereof that the content provider uses to produce and/or distribute the content 110. The users 115 can consume the content 110 using a variety of devices, e.g., a TV, a computer, a desktop, a laptop, a smartphone, a tablet PC.

The environment 100 includes a conversation management system 125 that can facilitate the users 115 to exchange conversations 120 about the content 110. In some embodiments, the conversation management system 125 is a social networking platform using which the users 115 associated with the social networking platform can exchange the conversations 120. The conversation management system 125 can use blockchain technology to manage the conversations 120. In some embodiments, a blockchain is a continuously growing list of records, called blocks, which are linked and secured using cryptography. Each block typically contains a cryptographic hash of the previous block, a timestamp and transaction data. By design, a blockchain is inherently resistant to modification of the data. It is "an open, distributed ledger that can record transactions between two parties efficiently and in a verifiable and permanent way. Once recorded, the data in any given block cannot be altered retroactively without the alteration of all subsequent blocks.

The conversation management system 125 can store the conversations 120 at a data storage system 130 as blocks in a conversation blockchain 135, and provide a secure access to the conversations to the content provider by providing access to one or more blocks of the conversation blockchain 135. In some embodiments, the conversation management system 125 stores each conversation as a separate block in the conversation blockchain 135. The conversation management system 125 adds a specified conversation to the conversation blockchain 135 as a block after computing a hash for the specified conversation, which indicates a quality of the specified conversation and also the number of tokens to be allocated to a specified user who submitted the specified conversation, validating the specified conversation based on validation input received from users associated with the specified user, and encrypting the validated conversation. The block is added to the conversation blockchain 135 and linked to the previous block of the conversation blockchain 135 by storing a hash of the previous block in the block. The conversation management system 125 provides the content provider a decryption key using which the content provider can access the validated conversation in the conversation blockchain 135. In some embodiments, by restricting the access to the conversations stored in the conversation blockchain 135 to only those entities that have the decryption key, the conversations are secure and prevented from being accessed by entities that do not have the decryption key.

Figure 2A:
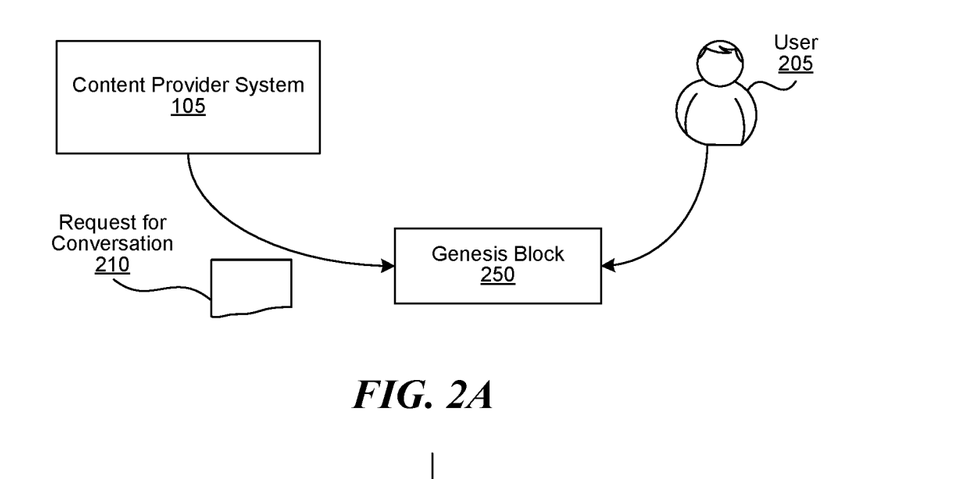
FIG. 2A is a block diagram of an example for generating a genesis block of a conversation blockchain, consistent with various embodiments.

FIGS. 2A-2E are block diagrams of an example for managing user conversations of FIG. 1 using blockchain. The example can be implemented using the conversation management system 125 of FIG. 1. FIG. 2A is a block diagram of an example for generating a genesis block of the conversation blockchain 135, consistent with various embodiments. The content provider system 105 sends a request for conversation 210 to the conversation management system 125, which is indicative of a request for obtaining conversations from one or more users 115 about the content 110. The conversation management system 125 generates a genesis block (e.g., a first block) 250 of the conversation blockchain 135 that is indicative of the request for conversation 210. In some embodiments, a genesis block is a first block of a blockchain. The genesis block 250 establishes a set of prioritized fields, e.g., conversational parameters, to be used for determining a quality of the conversation, which is also indicative of a number of tokens to be allotted to a user for submitting the conversation. Example of a conversation parameter includes any of cast and crew members noted in the conversation, storyline in the conversation, lack of spoilers in the conversation, sophistication of the conversation, contextual words in the conversation, grammar in the conversation, references to other films/shows in the conversation, filmmaking elements noted (acting, directing, writing, cinematography, music, editing, etc.), length of the conversation (not too short, but not too long), word count, sentence count, character count, number of seconds, uniqueness of the conversation (not the same as every other review on this movie and/or by this person), emotions (Happy, sad, funny, scary, angry, etc.), completion rate of audience watching or hearing the conversation, response emotions of audience watching or hearing it, positive reviews/likes of the conversation, number of times the conversation is played, number of adjectives in the conversation, lexical density, passive voice, readability, common words and phrases, date/time, location, and audience members physically present.

The genesis block 250 also establishes a maximum number of tokens the content provider is willing to pay per block on the blockchain, that is, per conversation. In some embodiments, the information regarding the conversational parameters and the maximum number of tokens can be provided by the content provider in the request for conversation 210. In some embodiments, the request for conversation 210 may also include a starter conversation, e.g., a conversation from the content provider that elicits conversations from the users 115. For example, a starter conversation can be "How do you like the story line of season 8 of Game of Thrones?"

The conversation management system 125 generates a conversation GUI using which the users 115 can view and/or carry out conversations 120 on the content 110. When a user 205 navigates to the conversation GUI, the conversation management system 125 displays the starter conversation associated with the genesis block 250. The user 205 can initiate a conversation in response to the starter conversation or independent of the starter conversation. The content provider can also use the conversation GUI to view the conversations 120. Further, the conversation management system 125 also generates a setup GUI for the content provider to specify (a) the conversational parameters to be used in determining the quality of the conversation, (b) a priority of one or more conversation parameters, and (c) the maximum number of tokens the content provider is willing to pay per block. The conversation management system 125 can provide access to the GUIs via a uniform resource locator (URL) that can be accessed using a web browser at a computing device associated with the user 205, or via an "app" that can be downloaded to and installed at the computing device. The users can register with the conversation management system 125 to post or exchange conversations about the content 110. For example, the users 115 can create a user account in app to become members of the social networking platform implemented by the conversation management system 125, and then associate with one or more users in the social networking platform, e.g., as friends or followers.

Figure 2B:
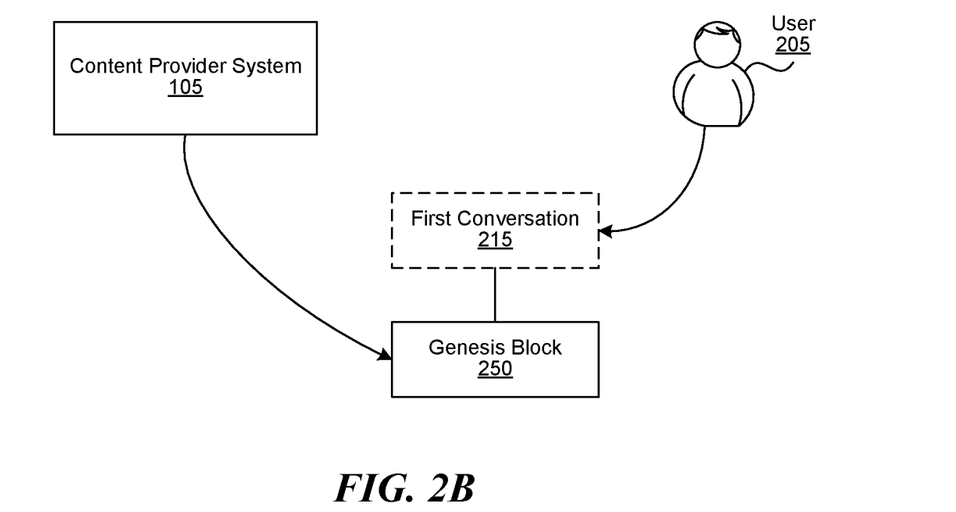
FIG. 2B is a block diagram of an example for posting a first conversation about a content, consistent with various embodiments.

FIG. 2B is a block diagram of an example for posting a first conversation about a content, consistent with various embodiments. When the user 205 navigates to the conversation GUI of the content 110, the conversation management system 125 displays the starter conversation from the content provider, which is stored in the genesis block 250. The user 205 can initiate a first conversation 215, which can be in response to the starter conversation or independent of the starter conversation. The first conversation 215 can be textual data, an audio recording, a video recording, or any other multimedia data that is descriptive of one or more aspects of the content 110. The user 205 can include in the first conversation 215 information about one or more aspects of the content 110, such as whether the user 205 liked the content 110; opinion about the story, actors, direction, production, or length of story.

The conversation management system 125 processes the first conversation 215 using a hash function to generate a hash. The hash function also determines a quality of the first conversation 215, which is used to determine how many tokens are to be granted to the user 205 in return for the first conversation 215. The hash function determines the quality of the first conversation 215 based on one or more conversational parameters (examples of which are also mentioned at least with reference to FIG. 2A) in the first conversation 215. For example, the quality of the first conversation 215 is determined based on cast and crew members noted, the storyline they are conversing about, the lack of spoilers; the sophistication of the words used; the context of the words; the quality of the grammar; references to other films or shows that are, especially within that providers network that they would encourage people to watch those other shows; numerous film-making elements like acting, directing, writing, cinematography; the length of the conversation; whether the conversation is unique (so if there's 500 conversations in the blockchain, is this conversation unique to something that nobody has ever said before); the emotions in the conversation; completion rate of audience watching it—so if other users start watching it and they only get halfway through every time, the lower is the quality, but if other users watch it and they get all the way through it every time, the higher is the quality. Also, the higher the quality of the first conversation 215, the higher the number of tokens to be allocated to the user 205.

After the hash is generated and the number of tokens to be awarded is determined, the conversation management system 125 proceeds to validate the first conversation 215. The number of tokens may not yet be awarded to the user 205 as the first conversation 215 has not yet been validated.

Figure 2C:
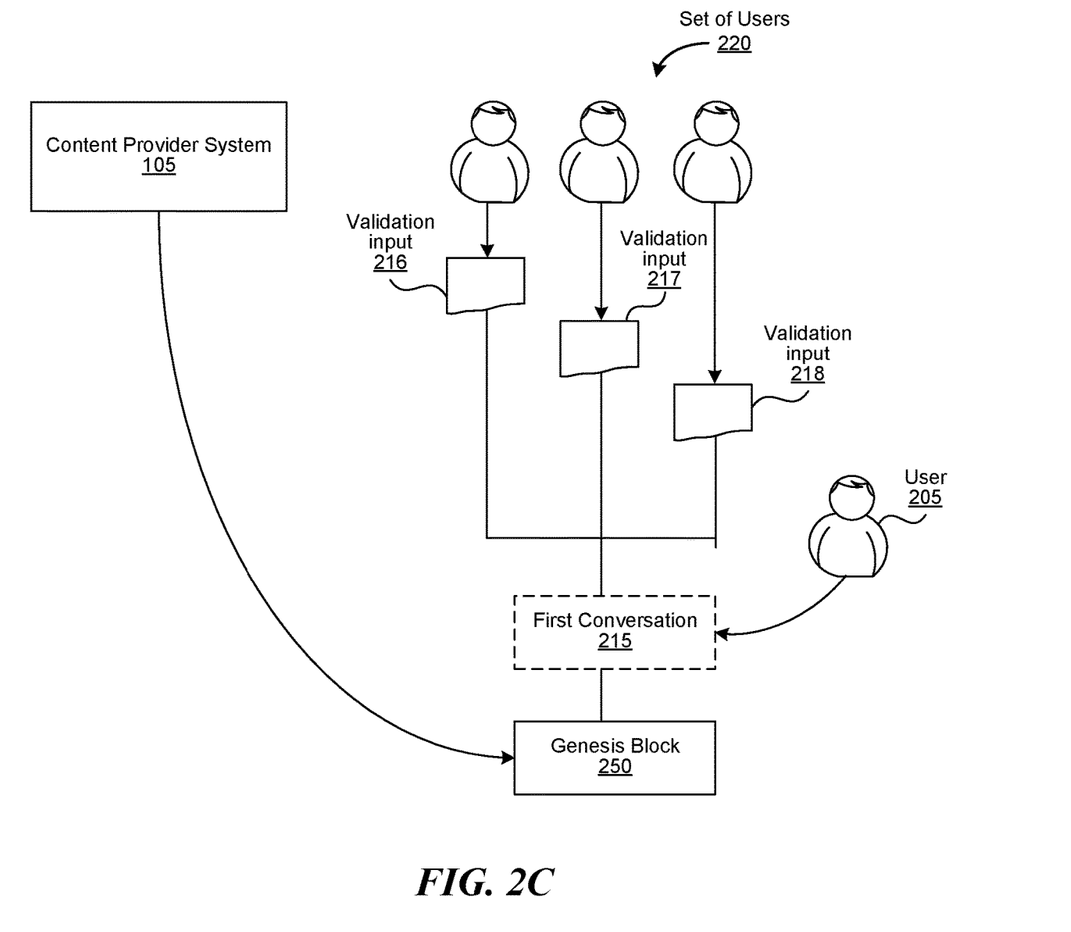
FIG. 2C is a block diagram of an example for validating the first conversation, consistent with various embodiments.

FIG. 2C is a block diagram of an example for validating the first conversation, consistent with various embodiments. After the user 205 submits the first conversation 215, the conversation management system 125 publishes the conversation to a set of users 220 associated with the user 205, e.g., friends of the user 205 in the social network platform. The first conversation 215 may not yet be accessible by the content provider though because it has not been validated yet.

The set of users 220 can validate the first conversation 215 by providing validation inputs 216-218, such as a like, a comment, an audio review, a video review, a tag, a dub, a back, a recommend, or share of the first conversation 215. For example, the validation input 216 from a first user of the set of users 220 can be a comment on the first conversation 215, the validation input 217 from a second user can also be a comment on the first conversation 215, and the validation input 218 from a third user can be a share of the first conversation 215 with other users in the social network platform. In some embodiments, a user can explicitly acknowledge that the first conversation 215 is legitimate, e.g., by selecting a "validate" button associated with the first conversation 215, or implicitly acknowledge, e.g., seeing the first conversation 215 for a specified number of seconds, which can be determined using facial recognition or other techniques. Further, some of the validations can happen outside of the conversation management system 125, e.g., in some third-party applications. However, since the conversation management system 125 can receive data from some third-party applications, e.g., that users have permitted data sharing with, the conversation management system 125 can still track those conversations and use them to validate the first conversation 215.

The conversation management system 125 uses a validation function to determine the number of validation points associated with the first conversation 215. In some embodiments, the validation function can be similar to the hash function which determines the quality of the first conversation 215. In some embodiments, the validation function can determine the number of validation points based on a number of users that have validated the first conversation within a specified duration.

If the validation points satisfy a specified criterion, e.g., exceeds a specified threshold or if the first conversation 215 is validated by "X" number of peers within "Y" time limit, the first conversation 215 is considered to be validated.

Figure 2D:
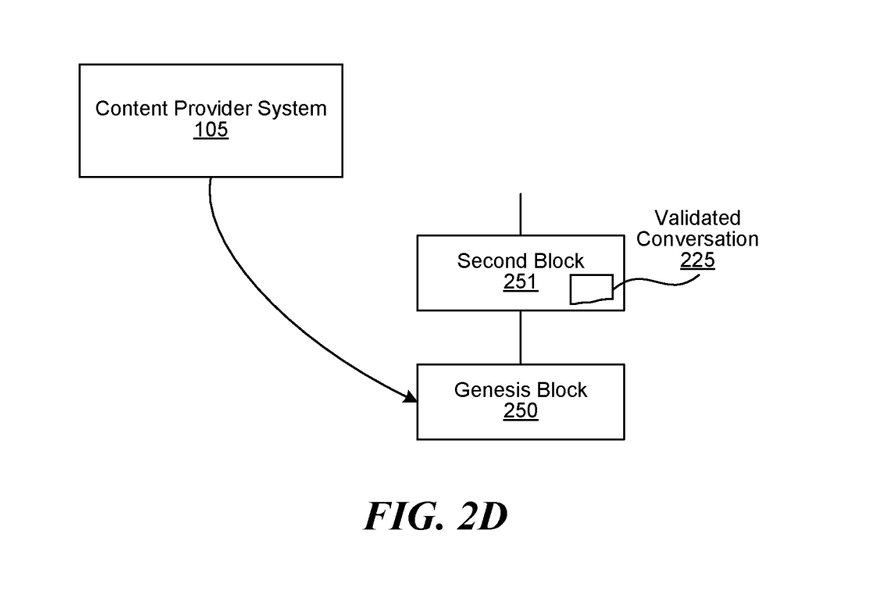
FIG. 2D is a block diagram of an example for adding a block corresponding to the first conversation to the conversation blockchain, consistent with various embodiments.

FIG. 2D is a block diagram of an example for adding a block corresponding to the first conversation to the conversation blockchain, consistent with various embodiments. Once the validation points associated with the first conversation 215 satisfies a specified criterion, the conversation management system generates a validated conversation 225 for the first conversation 215. The validated conversation 225 is stored as a second block 251, and the second block 251 is locked/added to the conversation blockchain 135. Once the second block 251 is locked to the conversation blockchain 135, the second block 251 cannot be altered. The second block 251 is locked in the conversation blockchain 135 by linking the second block 251 to a previous block in the conversation blockchain 135, e.g., the genesis block 250. The second block 251 is linked to the genesis block 250 by storing a hash of the genesis block 250 in the second block 251. In some embodiments, the conversation management system 125 secures the second block 251 in the conversation blockchain 135 by encrypting the second block 251. Subsequent conversations are added as a series of blocks to the conversation blockchain 135 and each block is locked into the conversation blockchain 135 by linking it to a previous block in the conversation blockchain 135. In some embodiments, each conversation is stored as a separate block in the conversation blockchain 135. For example, if there are 50 conversations about the content 110, the 50 conversations can be stored as 50 blocks in the conversation blockchain 135.

In some embodiments, the conversation management system 125 secures the second block 251 in the conversation blockchain 135 by encrypting the second block 251. Encrypting can ensure that the access to the blocks of data in the conversation blockchain 135 is restricted to entities with a decryption key.

In some embodiments, the validated conversation 225 is added to the conversation blockchain 135 if the user 205 has accepted a smart contract, which indicates that the user 205 permits the conversation management system 125 to store and share the first conversation 215 with one or more entities, e.g., the content provider. If the user 205 has not accepted the smart contract, the conversation management system 125 stores the first conversation 215 in the conversation blockchain 135 without validating it. However, the first conversation 215 is not shared with the content provider system 105, that is, the conversation management system 125 does not provide the content provider access to the first conversation 215. If the user 205 has accepted the smart contract, the first conversation 215 is stored as the validated conversation 225 and the content provider is provided access to the validated conversation 225. The set of users 220 can view the first conversation 215 regardless of whether it is validated or not.

In some embodiments, a smart contract is a computer code that can facilitate the exchange of money, content, property, shares, or anything of value. When running on the blockchain a smart contract becomes like a self-operating computer program that automatically executes when specific conditions are met. The conversation management system 125 can send the smart contract to the user 205 at any suitable time, e.g., upon the first conversation 215 being validated, or when the user 205 registers with the conversation management system 125.

Figure 2E:
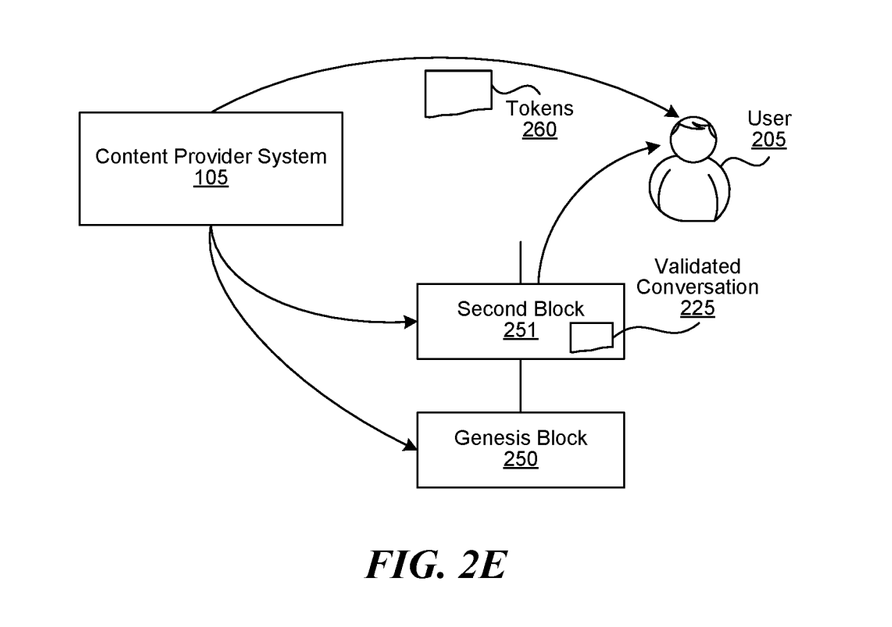
FIG. 2E is a block diagram of an example for publishing a validated conversation to a content provider, consistent with various embodiments.

FIG. 2E is a block diagram of an example for publishing a validated conversation to a content provider, consistent with various embodiments. After the second block 251 is locked to the conversation blockchain 135, the validated conversation 225 is made available to the content provider. The validated conversation 225 is either published to the content provider system 105 or the content provider system 105 can access the validated conversation 225 on demand. The content provider can access the validated conversation 225 using the decryption key provided by the conversation management system 125. While the content provider is provided access to validated conversations, unvalidated conversations are not made available to the content provider.

Further, the content provider system 105 allocates the determined number of tokens 260 (e.g., determined as described at least with reference to FIG. 2B) to the user 205 in exchange for the first conversation 215. The user 205 can exchange the token for a product, service, or fiat currency. For example, the user 205 can use a token(s) to (a) purchase a video such as TV shows, movies, short films, or any similar content; (b) exchange for real currency; (c) promote a particular conversation piece (i.e., a review, a comment, a picture, a video) to be viewed by more users; (d) enhance a new conversation piece to be better (by modifying conversational parameters); (e) initiate a one-on-one conversation with an entity (content provider, producer, director, actor).

Figure 3:
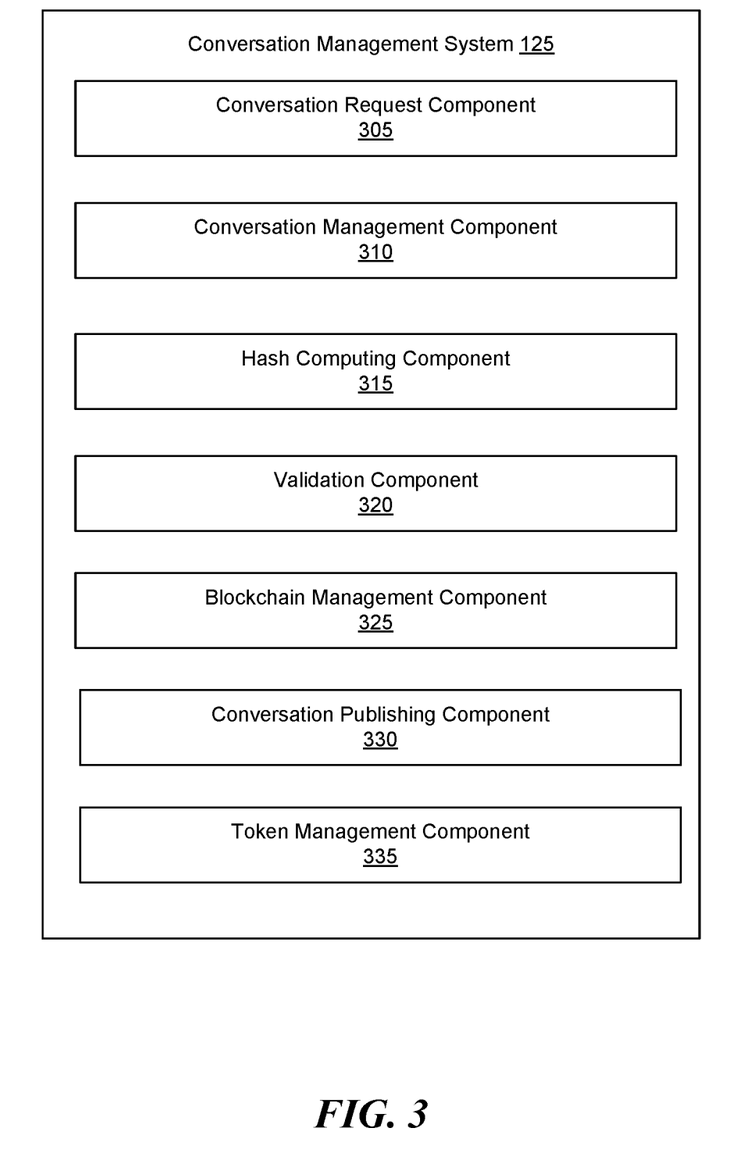
FIG. 3 is a block diagram of a conversation management system of FIG. 1, consistent with various embodiments.

FIG. 3 is a block diagram of the conversation management system of FIG. 1, consistent with various embodiments. The conversation management system 125 includes a number of components that facilitate in managing the conversations about a content using a blockchain. For example, the components include a conversation request component 305, a conversation management component 310, a hash computing component 315, a validation component 320, a blockchain management component 325, a conversation publishing component 330, and a token management component 335. The conversation request component 305 receives a request for conversation from the content provider and indicates the blockchain management component 325 to generate a genesis block of a blockchain based on the request for conversation. In some embodiments, multiple blockchains may be generated for a content, e.g., one for each aspect of the content. For example, a media provider such as HBO may premier a particular season of a particular television (TV) show, and HBO might want to have separate conversations for the TV show, the season and a particular episode in the season. The conversation management system 125 can generate a first blockchain to manage the conversations associated with the TV show, a second blockchain to manage the conversations associated with the particular season, and a third blockchain to manage the conversations associated with a particular episode. Accordingly, the conversation request component 305 can indicate the blockchain management component 325 to generate the genesis block in the appropriate blockchain.

The conversation management component 310 receives a conversation about the content from a user, and indicates the blockchain management component 325 to create a block corresponding to the conversation in the appropriate blockchain. The hash computing component 315 generates a hash for a conversation based on one or more conversational parameters present in the conversation. The hash can also be indicative of the quality of the conversation.

The validation component 320 validates the conversation based on validation input received from one or more users associated with the user who submitted the conversation and generates a validated conversation.

The blockchain management component 325 uses the blockchain technology to generate blocks of a conversation blockchain, e.g., the genesis block based on the request for conversation and other blocks of the blockchain to store the conversations about the content. The conversations stored in the blocks may or may not be validated.

The conversation publishing component 330 makes the validated conversations in the blockchain available to various entities such as the content provider of the content.

The token management component 335 determines the number of tokens to be allocated to a user in return for the conversation. In some embodiments, the number of tokens is determined based on the quality of the conversation, which is determined by the hash computing component 315. The token management component 335 can also facilitate the user to exchange the tokens for a product, service, or fiat currency.

Additional details with respect to the components of the conversation management system 125 are described at least with reference to FIGS. 4-6 below. Note that the conversation management system 125 illustrated in FIG. 3 is not restricted to having the above components. The conversation management system 125 can include lesser number of components, e.g., functionalities of two components can be combined into one component, or can include more number of components, e.g., components that perform other functionalities. In some embodiments, the functionalities of one or more of the above components can be split into two or more components. Furthermore, the components of the conversation management system 125 can be implemented at a single computing device or distributed across multiple computing devices.

Figure 4:
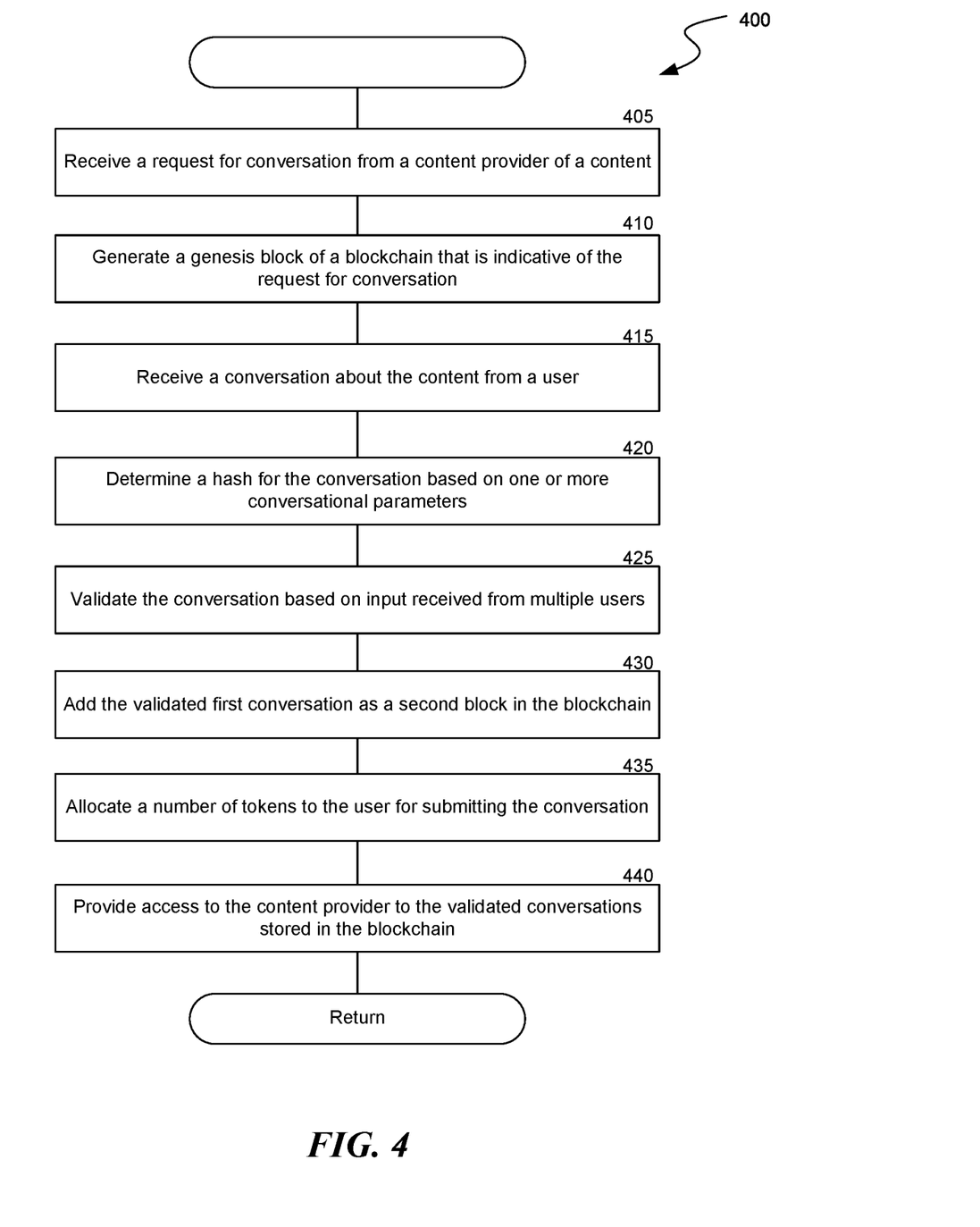
FIG. 4 is a flow diagram of a process for managing conversations about a content, consistent with various embodiments.

FIG. 4 is a flow diagram of a process 400 for managing conversations about a content, consistent with various embodiments. In some embodiments, the process 400 can be implemented in the environment 100 and using the conversation management system 125 of FIG. 1. At block 405, the conversation request component 305 receives a request for conversation from a content provider. For example, the conversation request component 305 receives the request for conversation 210 from the content provider system 105 for the content 110. The request for conversation can include information such as a set of prioritized fields, e.g., conversational parameters, to be used for determining a quality of the conversation and the maximum number of tokens the content provider is willing to pay per block of conversation.

At block 410, the blockchain management component 325 generates a genesis block of a blockchain that is indicative of the request for conversation. For example, the blockchain management component 325 generates a genesis block 250 of the conversation blockchain 135. The genesis block 250 establishes the set of prioritized fields to be used for determining a quality of the conversation and the maximum number of tokens the content provider is willing to pay per block of conversation.

At block 415, the conversation management component 310 receives a conversation about the content from a user. For example, the conversation management component 310 receives the first conversation 215 about the content 110 from the user 205. The user 205 can include information about one or more aspects of the content in the conversation, such as whether the user liked the content; opinion about the story, actors, direction, production, or length of story. Such information can be used as conversational parameters for determining a quality of the conversation.

At block 420, the hash computing component 315 generates a hash for the conversation based on one or more conversational parameters of the conversation. For example, the hash computing component 315 generates a hash for the first conversation 215. The hash computing component 315 can also determine the quality of the conversation. However, in some embodiments, the hash itself can be indicative of the quality of the conversation. Further, the hash computing component 315 or the token management component 335 determines a number of tokens to be allocated to the user based on the quality of the conversation. In some embodiments, the conversation management system 125 can use user-defined method (e.g., defined by the content provider system 105 or the conversation management system 125) for determining the number of tokens based on the quality of the conversation. In some embodiments, the higher the quality, the higher the number of tokens to be granted.

At block 425, the validation component 320 validates the conversation based on validation input received from multiple users. For example, the validation component 320 validates the first conversation 215 based on validation input received from a set of users 220 associated with the user 205. Upon validating the conversation, the validation component 320 generates a validated conversation. In some embodiments, the validated conversation includes the original conversation submitted by the user and the validation input received from the users for the original conversation.

At block 430, the blockchain management component 325 adds the validated conversation as a block in the blockchain. The block is then locked to the blockchain. For example, the blockchain management component 325 stores the validated conversation 225 as the second block 251 in the conversation blockchain 135. In some embodiments, when a specified block is locked to the blockchain, the block is linked to a previous block in the blockchain, e.g., by storing a hash of the previous block in the specified block. Subsequent conversations from the users are added as subsequent blocks in the blockchain. For example, a conversation received after the first conversation 215 is added as a third block subsequent to the second block 251 and linked to second block 251 by storing the hash of the second block 251 in the third block. In some embodiments, each conversation is stored as a separate block of the blockchain. Further, the block can be encrypted, e.g., using cryptography, when locked to the blockchain so that the block is secure. In some embodiments, the encryption of a block can prevent the block from being accessed by entities other than the intended communicants. The encryption can generate a "key," which controls the access to the block. The access to the block is restricted to the entities that have the key.

At block 435, the token management component 335 allocates the determined number of tokens (e.g., determined in block 420) to the user in return for the conversation. For example, the token management component 335 allocates the tokens 260 to the user 205 in return for the first conversation 215.

At block 440, the conversation publishing component 330 provides the content provider access to the validated conversations stored in the blockchain. In some embodiments, the content provider is provided access to only the validated conversations in the blockchain. The conversation publishing component 330 can either transmit the conversations to the content provider system 105, or provide the access to the conversations on demand. The content provider system 105 can access the conversations from the blockchain using a decryption key that is provided to the content provider system 105 by the conversation management system 125.

In some embodiments, the conversation management system 125 can provide the content provider access to the conversations in the blockchain in return for tokens. The number of tokens to be granted to the conversation management system 125 can be determined using a number of parameters, e.g., number of users carrying out the conversations, number of conversations being provided to the content provider, age of the content, period for which the content is made available to the users, number of tokens per block, a particular time slot of the content, etc.

Figure 5:
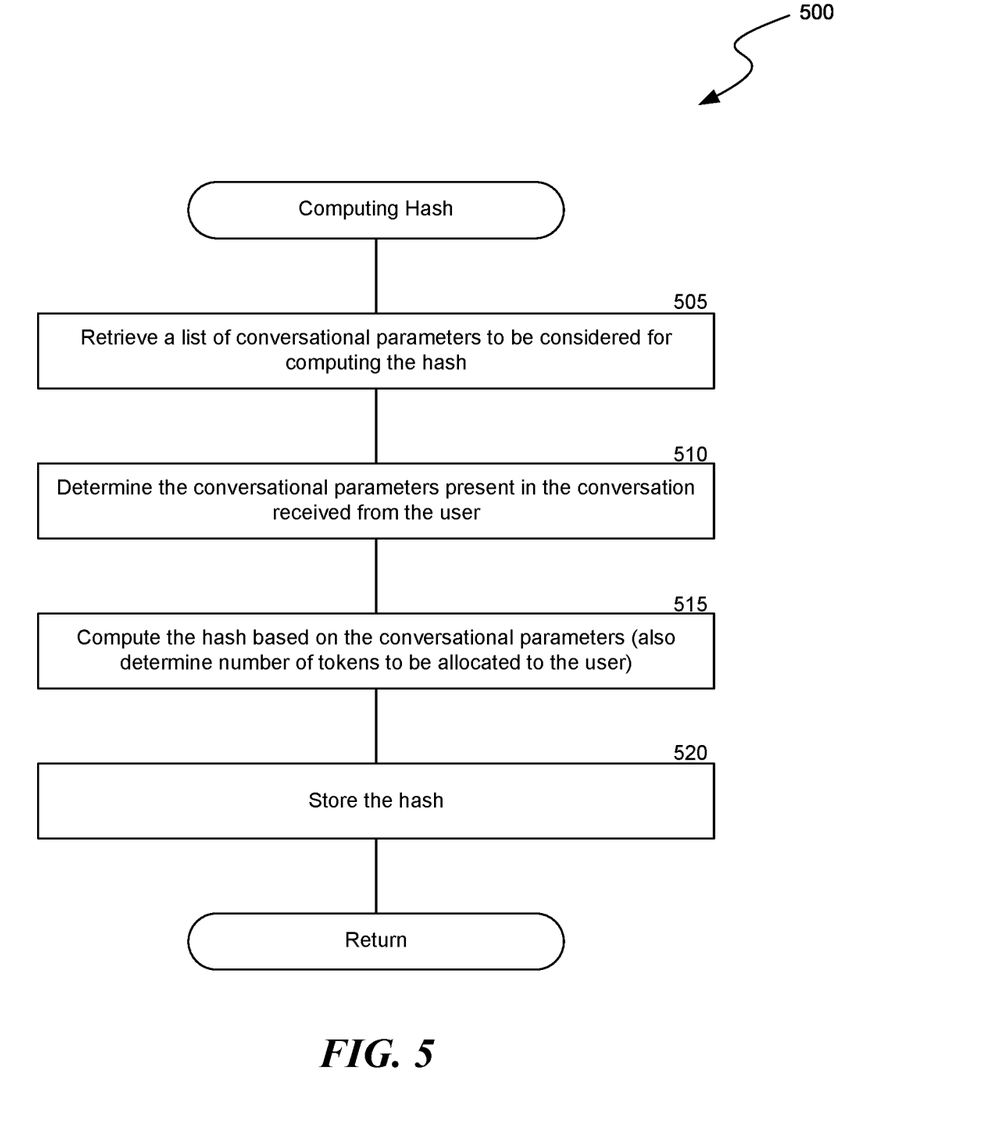
FIG. 5 is a flow diagram of a process for computing a hash of a conversation in the conversation blockchain, consistent with various embodiments.

FIG. 5 is a flow diagram of a process 500 for computing a hash of a conversation in the conversation blockchain, consistent with various embodiments. In some embodiments, the process 500 can be implemented in the environment 100 of FIG. 1 and as part of block 420 of process 400. At block 505, the hash computing component 315 retrieves a list of conversational parameters to be considered for computing the hash. The conversational parameters and the priorities of one or more of the conversational parameters are typically defined in the conversation blockchain 135 when the genesis block 250 is generated, and the hash computing component 315 can retrieve them from the genesis block 250. In some embodiments, the conversational parameters and their priorities are typically provided to the conversation management system 125 by the content provider in the request for conversation. For example, the conversational parameters and the priorities can be provided by the content provider system 105 as part of the request for conversation 210.

At block 510, the hash computing component 315 determines the conversational parameters present in the conversation received from the user. For example, the hash computing component 315 determines the conversational parameters present in the first conversation 215 received from the user 205. A hash function in the hash computing component 315 can use any of a number of techniques in determining the conversational parameters, e.g., natural language processing (NPL), semantic analysis, parsing, parts-of-speech tagging, etc. The conversational parameters that the hash function may search for include one or more of user's opinion about the story, actors, direction, production, or length of the story in the content, grammar of the conversation, length of the conversation, etc.

At block 515, the hash computing component 315 computes the hash based on the conversational parameters present in the conversation. The hash can also be indicative of the quality of the conversation, and the quality of the conversation determines the number of tokens to be granted to the user.

At block 520, the hash computing component 315 stores the hash in the blockchain. In some embodiments, the hash is also used to link two consecutive blocks of the blockchain, e.g., a second block 251 is linked to the last added block of the conversation blockchain 135, the genesis block 250, by storing the hash of the genesis block 250 in the second block 251.

Figure 6:
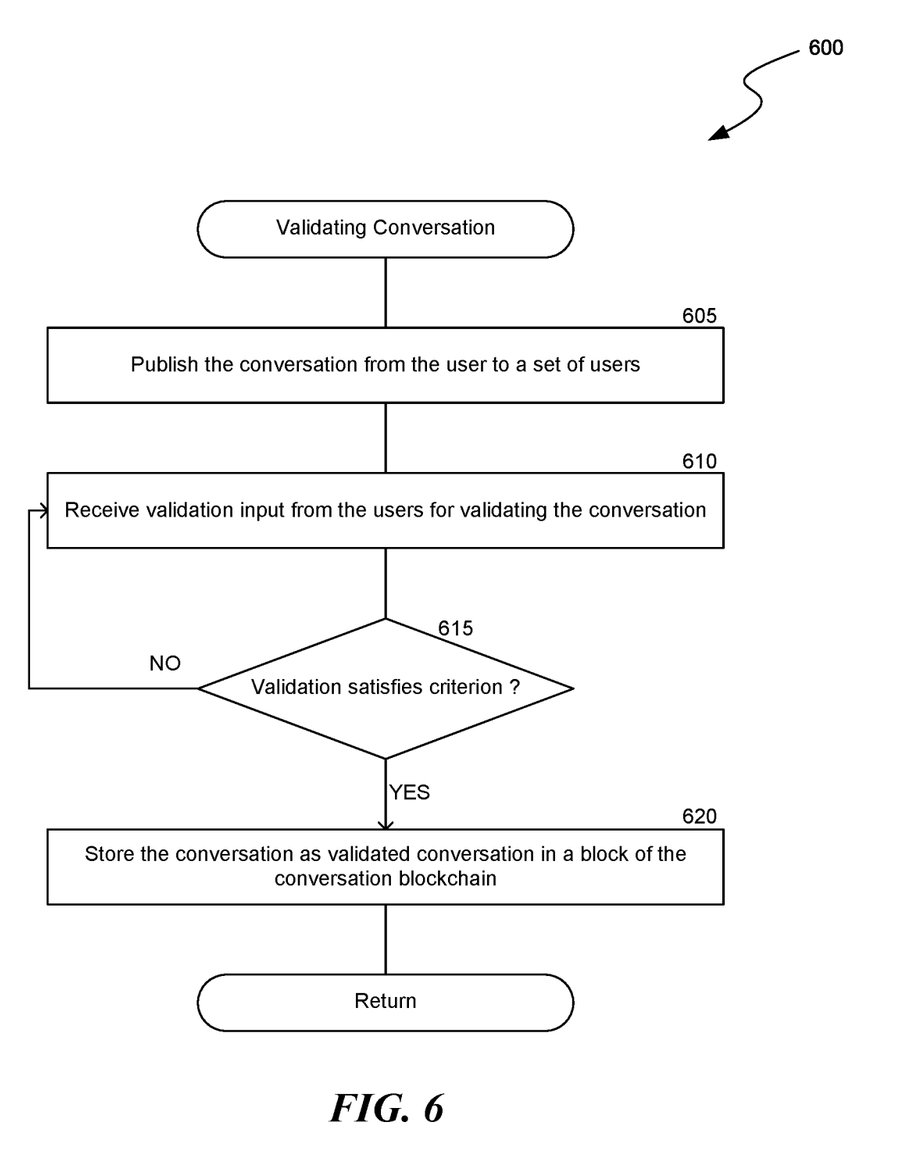
FIG. 6 is a flow diagram of a process for validating a conversation in the conversation blockchain, consistent with various embodiments.

FIG. 6 is a flow diagram of a process 600 for validating a conversation in the conversation blockchain, consistent with various embodiments. In some embodiments, the process 600 can be implemented in the environment 100 of FIG. 1 and as part of block 425 of process 400. At block 605, the validation component 320 publishes the conversation from the user to a set of users. For example, the validation component 320 publishes the first conversation 215 received from the user 205 to a set of users 220 who are connected to or associated with the user 205, e.g., friends of the user 205, in the conversation management system 125. The first conversation 215 may be viewed in the conversation GUI generated by the conversation management system 125.

At block 610, the validation component 320 receives validation input from the set of users for validating the conversation. The validation input can be any activity from the set of users 220, such as a like, a comment, an audio review, a video review, a tag, a dub, a back, a recommend, share of the first conversation 215, an explicit or implicit acknowledgement that the first conversation 215 is legitimate. Further, the validation component 320 can also track validations that happen outside of the conversation management system 125, e.g., in some third-party applications. If the users have permitted those third-party applications to share the data with the conversation management system 125, the validation component 320 can track those conversations and use them to validate the first conversation 215.

At determination block 615, the validation component 320 determines if the validation of the conversation satisfies a validation criterion. In some embodiments, the validation component 320 determines the number of validation points associated with the first conversation 215, e.g., using the hash function which determines the quality of the first conversation 215. In some embodiments, the validation component 320 can determine the number of validation points based on a number of users that have validated the first conversation within a specified duration, e.g., "X" number of peers have validated within "Y" time limit.

At block 620, if the validation satisfies the validation criterion, e.g., validation points exceeds a specified threshold, or if the number of users validating the first conversation 215 within a specified time limit exceeds a threshold, the first conversation 215 is considered to be validated, and the validation component 320 stores the validated conversation as a new block in the blockchain.

Figure 7:
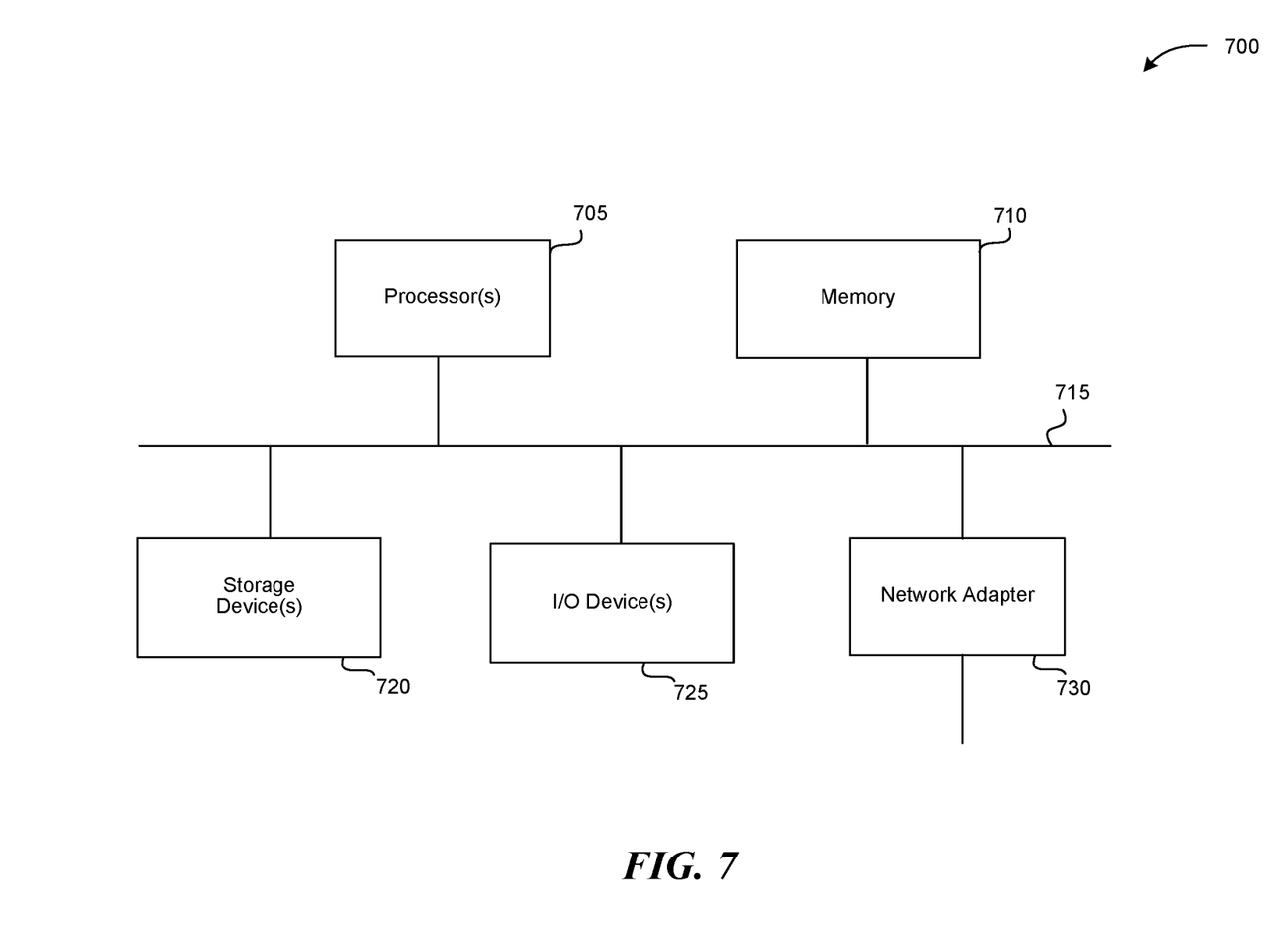
FIG. 7 is a block diagram of a processing system that can implement operations of the disclosed embodiments.

FIG. 7 is a block diagram of a computer system as may be used to implement features of the disclosed embodiments. The computing system 700 may be used to implement any of the entities, components or services depicted in the examples of the foregoing figures (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method of providing conversation integrity on a social networking platform, the method comprising:

generating, at the social networking platform, a genesis block in a blockchain that is indicative of a request for conversation associated with a content;

receiving, at the social networking platform, a conversation on the content from a first user device associated with a first user;

presenting, at the social networking platform, the received conversation to a second user device associated with a second user, wherein the second user is associated with the first user on the social networking platform;

determining, at the social networking platform, two or more conversational parameters present in the conversation using at least one of natural language processing (NLP), semantic analysis, parsing, or parts of speech tagging;

determining, at the social networking platform, a quality of the conversation based on the two or more conversational parameters and a priority assigned to each of the two or more conversational parameters, wherein the two or more conversation parameters include at least two of a word count of the conversation, a sentence count of the conversation, a length of time of the conversation, and words or phrases used in the conversation;

determining, at the social networking platform, a number of tokens to be allocated to the user device for submitting the conversation based on the quality of the conversation;

determining, at the social networking platform, a hash for the conversation based on the two or more conversational parameters present in the conversation and the priority assigned to each of the two or more conversational parameters, wherein the hash indicates the quality of the conversation and the number of tokens to be allocated to the user device;

receiving, at the social networking platform, a validation input from the second user device, wherein the validation input includes one or more of a: like, comment, audio review, video review, tag, dub, back, recommend, and/or share;

validating, at the social networking platform, the conversation based on the validation input to generate a validated conversation;

in response to validating the conversation,
encrypting, by the social networking platform, the validated conversation to be accessible by a content provider via a decryption key;
storing, by the social networking platform, the encrypted validated conversation as a second block in the blockchain; and allocating, by the social networking platform, the number of tokens to the user device for submitting the conversation.

2. The method of claim 1, further comprising:
permitting, at the social networking platform, the content provider to access validated conversations of users stored in the blockchain, and
restricting, at the social networking platform, the content provider from accessing conversations of the users that are not validated conversations.

3. The method of claim 1, further comprising:
setting a list of conversational parameters to be used in determining the hash.

4. The method of claim 1, further comprising:
receiving, from the content provider, a starter conversation that is descriptive of a specified aspect of the content;
storing the starter conversation in the genesis block; and
presenting the starter conversation to the first user device at a computing device associated with the first user device.

5. The method of claim 1, further comprising:
determining validation points for the conversation based on the validation input;
confirming that the validation points exceed a specified threshold, wherein confirming the validation points exceed the specified threshold includes confirming that the conversation is validated by a specified number of users within a specified period; and
generating the second block in the blockchain to store the conversation as the validated conversation.

6. The method of claim 1, further comprising:
sending a request for sharing the conversation to the first user device;
receiving a response from the first user device indicating an approval or disapproval to share; and in response to receiving the approval, storing the conversation as the validated conversation in the second block.

7. The method of claim 1, further comprising:
permitting the first user device to exchange a portion or all of the number of tokens for any of a product, service, or fiat currency.

8. A system comprising:
one or more processors; and
one or more memories storing instructions that, when executed by the one or more processors, cause the system to perform a process comprising:
  generating, at a social networking platform, a genesis block in a blockchain that is indicative of a request for conversation associated with a content;
  receiving, at the social networking platform, a conversation on the content from a user device;
  determining, at the social networking platform, two or more conversational parameters present in the conversation using at least one of natural language processing (NLP), semantic analysis, parsing, or parts of speech tagging;
  determining, at the social networking platform, a quality of the conversation based on the two or more conversational parameters and a priority assigned to each of the two or more conversational parameters, wherein the two or more conversation parameters include at least two of a word count of the conversation, a sentence count of the conversation, a length of time of the conversation, and words or phrases used in the conversation;
  determining, at the social networking platform, a number of tokens to be allocated to the user device for submitting the conversation based on the quality of the conversation;
  determining, at the social networking platform, a hash for the conversation based on the two or more conversational parameters present in the conversation and the priority assigned to each of the two or more conversational parameters, wherein the hash indicates the quality of the conversation and the number of tokens to be allocated to the user device;
  receiving a validation input from multiple user devices, wherein the validation input includes one or more of a: like, comment, audio review, video review, tag, dub, back, recommend, and/or share;
  validating, at the social networking platform, the conversation based on the validation input to generate a validated conversation;
  in response to validating the conversation,
    encrypting, by the social networking platform, the validated conversation to be accessible by a content provider via a decryption key;
    storing, by the social networking platform, the encrypted validated conversation as a second block in the blockchain; and
    allocating, by the social networking platform, the number of tokens to the user device for submitting the conversation.

9. The system according to claim 8, wherein the process further comprises:
permitting, at the social networking platform, the content provider to access validated conversations of users stored in the blockchain; and
restricting, at the social networking platform, the content provider from accessing conversations of the users that are not validated conversations.

10. The system according to claim 8, wherein the process further comprises:
setting a list of conversational parameters to be used in determining the hash.

11. The system according to claim 8, wherein the process further comprises:
receiving, from the content provider, a starter conversation that is descriptive of a specified aspect of the content;
storing the starter conversation in the genesis block; and
presenting the starter conversation to the user device at a computing device associated with the user device.

12. The system according to claim 8, wherein the process further comprises:
determining validation points for the conversation based on the validation input;
confirming that the validation points exceed a specified threshold, wherein confirming the validation points exceed the specified threshold includes confirming that the conversation is validated by a specified number of users within a specified period; and
generating the second block in the blockchain to store the conversation as the validated conversation.

13. The system according to claim 8, wherein the process further comprises:
sending a request for sharing the conversation to the user device;
receiving a response from the user device indicating an approval or disapproval to share; and
in response to receiving the approval, storing the conversation as the validated conversation in the second block.

14. The system according to claim 8, wherein the process further comprises:
permitting the user device to exchange a portion or all of the number of tokens for any of a product, service, or fiat currency.

15. A non-transitory computer-readable medium storing instructions that, when executed by a computing system, cause the computing system to perform operations comprising:
generating, at a computer system, a genesis block in a blockchain that is indicative of a request for conversation associated with a content;
receiving, at the computer system, a conversation on the content from a user device;
determining, at the computer system, two or more conversational parameters present in the conversation using at least one of natural language processing (NLP), semantic analysis, parsing, or parts of speech tagging;
determining, at the computer system, a quality of the conversation based on the two or more conversational parameters and a priority assigned to each of the two or more conversational parameters, wherein the two or more conversation parameters include at least two of a word count of the conversation, a sentence count of the conversation, a length of time of the conversation, and words or phrases used in the conversation;
determining, at the computer system, a number of tokens to be allocated to the user device for submitting the conversation based on the quality of the conversation;
determining, at the computer system, a hash for the conversation based on the two or more conversational parameters present in the conversation and the priority assigned to each of the two or more conversational parameters, wherein the hash indicates the quality of the conversation and the number of tokens to be allocated to the user device;

receiving a validation input from multiple user devices, wherein the validation input includes one or more of a: like, comment, audio review, video review, tag, dub, back, recommend, and/or share;

validating, at the computer system, the conversation based on the validation input to generate a validated conversation;

in response to validating the conversation,
encrypting, by the computer system, the validated conversation to be accessible by a content provider via a decryption key;
storing, by the computer system, the encrypted validated conversation as a second block in the blockchain; and
allocating, by the computer system, the number of tokens to the user device for submitting the conversation.

16. The non-transitory computer-readable medium of claim 15, wherein the operations further comprise:
permitting, at the computer system, the content provider to access validated conversations of users stored in the blockchain; and
restricting, at the computer system, the content provider from accessing conversations of the users that are not validated conversations.

17. The non-transitory computer-readable medium of claim 15, wherein the operations further comprise:
setting a list of conversational parameters to be used in determining the hash.

18. The non-transitory computer-readable medium of claim 15, wherein the operations further comprise:
receiving, from the content provider, a starter conversation that is descriptive of a specified aspect of the content;
storing the starter conversation in the genesis block; and
presenting the starter conversation to the user device at a computing device associated with the user device.

19. The non-transitory computer-readable medium of claim 15, wherein the operations further comprise:
determining validation points for the conversation based on the validation input;
confirming that the validation points exceed a specified threshold, wherein confirming the validation points exceed the specified threshold includes confirming that the conversation is validated by a specified number of users within a specified period; and
generating the second block in the blockchain to store the conversation as the validated conversation.

20. The non-transitory computer-readable medium of claim 15, wherein the operations further comprise:
sending a request for sharing the conversation to the user device;
receiving a response from the user device indicating an approval or disapproval to share; and
in response to receiving the approval, storing the conversation as the validated conversation in the second block.

* * * * *